United States Patent
Arnold

(10) Patent No.: US 8,113,087 B2
(45) Date of Patent: Feb. 14, 2012

(54) BICYCLE HANDLE-BAR GRIP

(75) Inventor: Franc Arnold, Koblenz (DE)

(73) Assignee: RTI Sports Vertrieb von Sportartikeln GmbH (DE)

( * ) Notice: Subject to any disclaimer, the term of this patent is extended or adjusted under 35 U.S.C. 154(b) by 856 days.

(21) Appl. No.: 10/567,385

(22) PCT Filed: Aug. 18, 2004

(86) PCT No.: PCT/EP2004/009258
§ 371 (c)(1),
(2), (4) Date: Jul. 28, 2006

(87) PCT Pub. No.: WO2005/021366
PCT Pub. Date: Mar. 10, 2005

(65) Prior Publication Data
US 2007/0089559 A1    Apr. 26, 2007

(30) Foreign Application Priority Data

Aug. 25, 2003 (DE) .............................. 203 13 217 U
Sep. 11, 2003 (DE) .............................. 203 14 150 U
May 21, 2004 (DE) .................... 20 2004 008 297 U

(51) Int. Cl.
*B62K 21/26* (2006.01)
(52) U.S. Cl. ..................................... 74/551.9
(58) Field of Classification Search ............ 74/488, 74/489, 551.1, 551.8, 551.9; 16/421, 427, 16/430, 436; 81/177.1
See application file for complete search history.

(56) References Cited

U.S. PATENT DOCUMENTS

| 6,003,405 A * | 12/1999 | Giard ............................ 74/551.3 |
| 6,421,879 B1 * | 7/2002 | Gratz et al. ..................... 16/422 |
| 6,964,214 B2 * | 11/2005 | Wu ............................... 74/551.8 |
| 2006/0053955 A1 * | 3/2006 | Arnold ......................... 74/551.8 |

FOREIGN PATENT DOCUMENTS

| DE | 9112567 | 12/1991 |
| DE | 20303932 | 5/2003 |
| WO | WO9939970 | 8/1999 |

* cited by examiner

*Primary Examiner* — Vicky Johnson
(74) *Attorney, Agent, or Firm* — Ohlandt, Greeley, Ruggiero & Perle, LLP

(57) ABSTRACT

A bicycle bar grip, particularly for touring bikes, mountain bikes and the like, comprising a sleeve for being slipped onto a bike handlebar. A grip element is joined to the sleeve and extends over a portion of the length of the sleeve. The sleeve also comprises a clamping area and a sleeve slot. A holding bar end extension is arranged in the clamping area via a clamp. The grip element has a supporting portion, which is provided for supporting a palm of the hand and which preferably transitions into a holding portion. The supporting portion ensures that a cyclist, when changing his/her grip from the grip element to the holding bar end extension or vice versa, can be supported on the supporting portion for turning the palm of the hand. This ensures that the cyclist, also when changing his/her grip, does not lose contact with the inventive bicycle handlebar grip and a sure hold by the cyclist is ensured.

32 Claims, 4 Drawing Sheets

BICYCLE HANDLE-BAR GRIP

FIELD OF THE INVENTION

The invention relates to a bicycle bar grip, particularly for racing bikes, mountain bikes and the like.

DISCUSSION OF THE BACKGROUND ART

Substantially, bicycle bar grips are configured as cylindrical grip elements for being slipped onto a bike handlebar. In order to avoid a displacement of the bicycle bar grip, it is arranged such that it projects beyond the grip area of the bicycle bar grip. By means of a screw connection, the bicycle bar grip is clamped with the bike handlebar into this projecting clamping area.

Further, it is known to use holding bar end extensions which substantially have a horn-shaped configuration. The holding bar end extensions are plugged into a bike handlebar or slipped thereon from outside and clamped therewith.

From U.S. Pat. No. 6,421,879 B1, it is known to slip the holding bar end extension onto the sleeve of a bicycle bar grip and to simultaneously clamp both the bicycle bar grip and the holding bar end extension at the handlebar thereby. By this clamping, the bicycle bar grip and the holding bar end extension form a unit. A disadvantage of such an arrangement is that a secure steering by the cyclist is not guaranteed when he alters his grip from a tubular grip element of the bicycle bar grip to a horn-shaped holding bar end extension and vice versa. A secure hold of the cyclist is especially important with touring bikes in particular, by means of which long distances are covered and where the grip is often altered, in order to be able to get quickly out of the way of suddenly appearing sources of danger in traffic. A secure hold of the cyclist is also important with mountain bikes which are also ridden downhill, since dangerous falls may otherwise be the consequence.

It is the object of the present invention to provide a bicycle bar grip wherein the hold of a cyclist is improved.

SUMMARY OF THE INVENTION

The bicycle bar grip according to the invention comprises a sleeve for being slipped onto a bike handlebar. The sleeve has a sleeve slot so that the sleeve can be clamped with the bike handlebar. Further, the bicycle bar grip comprises a grip element that can be encompassed by a hand of a cyclist at least partially. The grip element is arranged at an outside of the sleeve and connected therewith. The grip element extends over a part of the sleeve length so that a clamping area remains free at an edge of the sleeve in which clamping area a clamping means for clamping the bicycle bar grip with the bike handlebar is connected with the sleeve. According to the invention, the grip element comprises a supporting portion for supporting a palm and a holding portion. Substantially, the supporting portion has, e.g., a projection-shaped, wedge-shaped and/or wing-shaped configuration so that a supporting surface is created on which the palm of a cyclist is supported when the grip element is gripped. At a distance from the sleeve, the holding portion projects into the clamping area and forms an integral unit with the supporting portion in particular. The supporting portion and the holding portion are configured such that they form a common grip surface and/or a common holding surface together with the clamping means. When the hand of the cyclist is in a gripping position, i.e., the grip element is substantially gripped in circumferential direction, the clamping means is also gripped so that the supporting portion and the holding portion form a common grip surface with the clamping means. When the hand of the cyclist is in a holding position, i.e., the grip element is substantially held vertical to the bike handlebar at its outmost end, the clamping means is held along with it so that the supporting portion and the holding portion form a common holding surface with the clamping means.

By this arrangement, the clamping means is not arranged next to the grip element but in the grip element. Thereby, the clamping force applied by the clamping means is transferred inward from outside. Thus, the applied clamping force is nearer to the point at which the hand applies the greatest force onto the bicycle bar grip. In case of a comparable clamping force, the bicycle bar grip is better protected from being unintentionally twisted about the handlebar. Due to the improved protection from twisting, the hold of the cyclist is also improved with high loads such as those occurring, e.g., when riding downhill. Further, it is possible to shorten the entire bicycle bar grip width by the width of the clamping means which is, e.g. a slitted clamping ring, since a clamping area projecting from the actual grip area of the bicycle bar grip is avoided. This is particularly advantageous with bent handlebars since the room available for a bicycle bar grip is highly limited with such handlebars. Thus, there remains more room for attaching further operational elements, e.g., a bike bell or a shifter.

In their shape, the supporting portion, the holding portion and the clamping means match each other in such a manner that their surfaces are in mutual alignment, i.e., there are no disturbing projections, steps, shoulders, trenches and the like. Instead, the supporting portion and the holding portion form an operational unit together with the clamping means. Preferably, the clamping means is no visually disturbing addition but part of the bicycle bar grip so that optics and function are combined in an integral design.

Preferably, the supporting portion is in contact with the palm of the cyclist during gripping in the grip surface as well as during holding in the holding surface. Thus, the supporting portion forms a supporting surface, together with the holding portion, if necessary, on which the cyclist is able to support himself without losing the contact with the bicycle bar grip when he alters his grip, i.e., when the hand changes from a gripping position to a holding position or vice versa. To this end, the supporting portion particularly comprises a contact surface which is preferably formed three-dimensionally in such a manner that a substantially unhindered change of grip is ensured when the palm turns on the contact surface.

It is particularly preferred that the clamping means be configured as a holding bar end extension. The holding surface is increased thereby. In this embodiment, the clamping means forms part of the holding bar end extension. Further, the hold of the cyclist is improved when the hand is in the holding position. Since the holding portion is also held upon holding, the holding bar end extension may be shorter and has a length which, together with the holding portion, substantially corresponds to the width of a hand.

An independent feature of the invention consists in a bicycle bar grip which, first of all, comprises a sleeve for being slipped onto a bike handlebar. The sleeve comprises a sleeve slot so that the sleeve can be clamped with the bike handlebar. Further, the bicycle bar grip comprises a grip element that is adapted to be encompassed at least partially by a hand of a cyclist. The grip element is arranged at an outside of the sleeve and connected therewith. The grip element extends over a part of the sleeve length so that at an edge of the sleeve, a clamping area remains free for the arrangement of a clamping means. Further, the bicycle bar grip comprises a holding bar end extension with a clamping means, the clamping means being arranged in the clamping area of the sleeve in order to connect the holding bar end extension with the grip element. According to the invention, the grip element comprises a supporting portion for supporting a palm. Substantially, for example, the supporting portion is projection-shaped, wedge-shaped and/or wing-shaped so that a supporting surface is formed on which the palm of a cyclist is supported when the grip element is gripped.

Through the supporting portion, the cyclist is offered a supporting surface spaced from a central axis of the bike handlebar. For altering the grip, i.e., altering the grip of the hand from the grip element to the holding bar end extension or vice versa, the cyclist may support on the supporting portion and alter the grip without losing contact with the bicycle bar grip. To this end, the supporting portion particularly comprises a contact surface that is preferably configured three-dimensionally in such a manner that a substantially unhindered change of grip is ensured when the palm turns on the contact surface. Hence, the supporting portion also operates as a pivot bearing shell on which the palm turns upon altering the grip. Outside, i.e., at the end facing the clamping area, the supporting portion is preferably thicker than inside, i.e., at the end facing away from the clamping area. Thereby, it is ensured that a distance to a central line of the sleeve is greater outside than inside. Due to this fact, there is always a contact between the hand of the cyclist and the bicycle bar grip according to the invention so that the hold of the cyclist is improved and falls are avoided. Further, the supporting portion distributes loads that are transferred from the bike to the hand, e.g., at high speeds or when riding downhill, upon a larger surface. The optimized distribution of pressure avoids that the hand of the cyclist becomes numb. Further, strains of the hand are reduced and the grip comfort is improved. Additionally, the grip of the hand is forced into a defined position when gripping the grip element whereby the position of the hand is automatically corrected.

In a preferred embodiment, the grip element further comprises a holding portion which is also held at least partially by the hand of the cyclist when holding the holding bar end extension. Thereby, the holding portion is used as a part of the holding bar end extension and forms an operational unit therewith for holding the holding bar end extension. Thus, the function to ensure a secure holding is distributed among two components, i.e., the holding bar end extension and the holding portion. Compared with conventional holding bar end extensions, the holding bar end extension may be shorter. Particularly, the holding bar end extension has a length which, together with the holding portion, substantially corresponds to the width of a hand. Hence, the length of the holding bar end extension corresponds to 14 cm at maximum, preferably 10 cm at maximum and, in a particularly preferred manner, 7 cm at maximum.

Particularly, the holding portion smoothly changes into the supporting portion and forms an integral unit therewith. Preferably, the holding portion projects into the clamping area at a distance from the sleeve and particularly, it projects from the supporting portion such that it is in alignment with the holding bar end extension at the height of the clamping area. In a particularly preferred embodiment, the holding portion has an inner contour facing the holding bar end extension, which corresponds at least to a part of an outer contour of the holding bar end extension and preferably abuts thereon. Particularly, the holding portion substantially changes smoothly into the holding bar end extension.

Both bicycle bar grips according to the invention can be modified as will be described hereinafter.

Preferably, the position of the holding bar end extension or the clamping means relative to the grip element is adjustable, e.g., by pivot ability of the holding bar end extension or the clamping means in the clamping area. Thereby, the grip position and the holding position of the hand can be matched individually. By means of a fixing means, the position can be fixed in a frictionally engaged or positive manner. The positioning of the holding bar end extension or of the clamping means relative to the grip element is preferably effected smoothly and thus, it is individually adjustable.

Particularly, the holding portion has a contour corresponding to the ball of the thumb which results in a uniform distribution of force for the ball of the thumb when holding the holding bar end extension. Accordingly, the supporting portion preferably has a contour corresponding to the contour of the palm so that a uniform distribution of force onto the palm is ensured when gripping the grip element.

In a preferred embodiment, the holding bar end extension or the clamping means as well as the grip element are covered by a shell at least partially. Particularly, the shell covers the clamping means of the holding bar end extension so that the clamping means is protected from moisture and corrosion. Further, the shell levels out unevennesses at the connection sites between the holding bar end extension and the grip element and eliminates vibrations.

Preferably, the shell is configured as a spacing fabric so that the bicycle bar grip is additionally padded. Suitable spacing fabrics are described in DE 90 16 065, for example. Particularly well suitable spacing fabrics transporting moisture comprise, e.g., fibers between an upper side and an underside of the spacing fabric, the fibers transporting moisture, i.e., being hydrophilic. Such spacing fabrics are described, for example, in DE 196 35 170 and DE 199 10 785. Thereby, it is possible to particularly transport sweat occurring at the palms away from the body whereby the gripping of the grip element and the holding of the holding bar end extension is more secure since the danger of slipping off is reduced. Further, the comfort is improved thereby.

Preferably, the grip element comprises a pad filled with a deformable, particularly gel-like material, e.g., gel, soft rubber or foamed material. The pad has a higher deformability than the grip element so that an additional padding can be realized. The pad comprises a spacing fabric, for example. Particularly, the supporting portion and/or the holding portion comprise the pad so that particularly the palm and the ball of the thumb are protected from vibrations.

It is particularly preferred that the grip element comprises a connection projection projecting into the clamping area of the sleeve. When the sleeve is clamped by the clamping means of the holding bar end extension, the connection projection is clamped therewith so that a secure connection of the grip element with the sleeve is ensured. Additionally or alternatively, the grip element can be connected with the sleeve by, e.g., glueing or vulcanizing.

To improve the grip, the grip element particularly comprises recesses for receiving the fingers. Thereby, the grip element abuts at least partially on the side surfaces of the fingers of the cyclist as well so that the secure gripping of the grip element is further improved.

Particularly, the clamping means comprises a screw cooperating with a blind hole thread. Further, the clamping means preferably comprises an opening in which a horn slot is arranged. By tightening the screw, the circumference of the opening is reduced so that a clamping effect is achieved. Preferably, the screw is arranged such that a screw head of the screw is completely sunk in the clamping means so that possible injuring edges are avoided and the comfort is improved.

The sleeve slot and/or the horn slot may be filled at least partially with an elastomer material. Thereby, notches of the sleeve or the holding bar end extension which might be caused by the horn slot or the sleeve slot upon clamping are avoided. Further, this reduces the friction between the sleeve and the handlebar upon clamping so that an additional protection against torsion is realized. Thus, the hold of the cyclist is improved even if the clamping effect should decrease. This increases the safety of the cyclist. Particularly, the elastomer material corresponds with the material of the grip element so that the production of the bicycle bar grip according to the invention is made easier.

In another embodiment, the sleeve has a wing-shaped projection projecting into the supporting portion of the grip element. Preferably, the wing-shaped projection additionally points into the holding portion of the grip element. Thereby, occurring forces can be transferred more easily. Particularly, the grip element is injected around the wing-shaped projection. It is particularly advantageous to provide through holes in the wing-shaped projection. When the grip element is injected around the wing-shaped projection, webs are formed that extend through the through holes and form a connection between the opposite sides of the grip element through the projection. Thereby, a displacement of the grip element on the sleeve is avoided.

Preferably, the sleeve itself also comprises through holes that are penetrated by the material of the grip element when it is injected around. Because of this, the material of the grip element comes into contact with the handlebar tube when the bicycle bar grip is slipped on and increases the friction between the handlebar grip and the handlebar tube thereby. This has the advantage that the bicycle bar grip does not work loose so easily if, for example, the clamping effect of the clamping element decreases since they have loosened, for example.

In another preferred embodiment, the surface of the grip element has at least one, preferably more, frictional zones. Preferably, several frictional zones with different frictions are formed. One frictional zone may be provided where the ball of the thumb abuts, a medium friction being given in this region to achieve a better grip and avoid a slipping of the ball of the thumb. In the region of the thumb and the index finger, an area with low friction is provided. This is advantageous for shifting gears and braking. Further, an area with high friction may be provided in the region of the fingertips. Thereby, the safety is increased upon riding downhill in particular. Preferably, the bicycle bar grip according to the invention comprises all three frictional areas described above. Depending on the application field of the bicycle bar grip, the latter, however, may only comprise one or two of the above-described frictional areas.

In another preferred embodiment, the bicycle bar grip is offset with respect to the handlebar. "Offset" means that, for example, the central axis of the bicycle bar grip is inclined with respect to the central axis of the handlebar. An offset by means of which an improved position of the wrist shall be achieved, however, can be particularly achieved, according to the invention, by the fact that the grip element of the bicycle bar grip comprises a thickening substantially in the middle. Preferably, the thickening is provided on the front side or the finger side of the grip element. Therefore, the thickening is preferably provided on the side of the grip element facing away from the body. The thickening is preferably positioned in the region of the middle finger. Even with a thickening of 1-2 mm, a desired offset may be achieved, if necessary. By means of the offset, the position of the wrist is optimized such that, in contrast to conventional positions of the wrist, no nerves are clamped when riding the bicycle. This has the advantage that even on longer rides, the wrists do not hurt. Because of the offset according to the invention, the wrist substantially stays straight. Because of the configuration of the bicycle bar grip according to the invention, this can also be ensured in different grip positions.

BRIEF DESCRIPTION OF THE DRAWINGS

Hereinafter, the invention will be explained in detail with respect to preferred embodiments thereof with reference to the accompanying drawings.

In the Figures.

DETAILED DESCRIPTION OF THE PREFERRED EMBODIMENT

Figure 1:
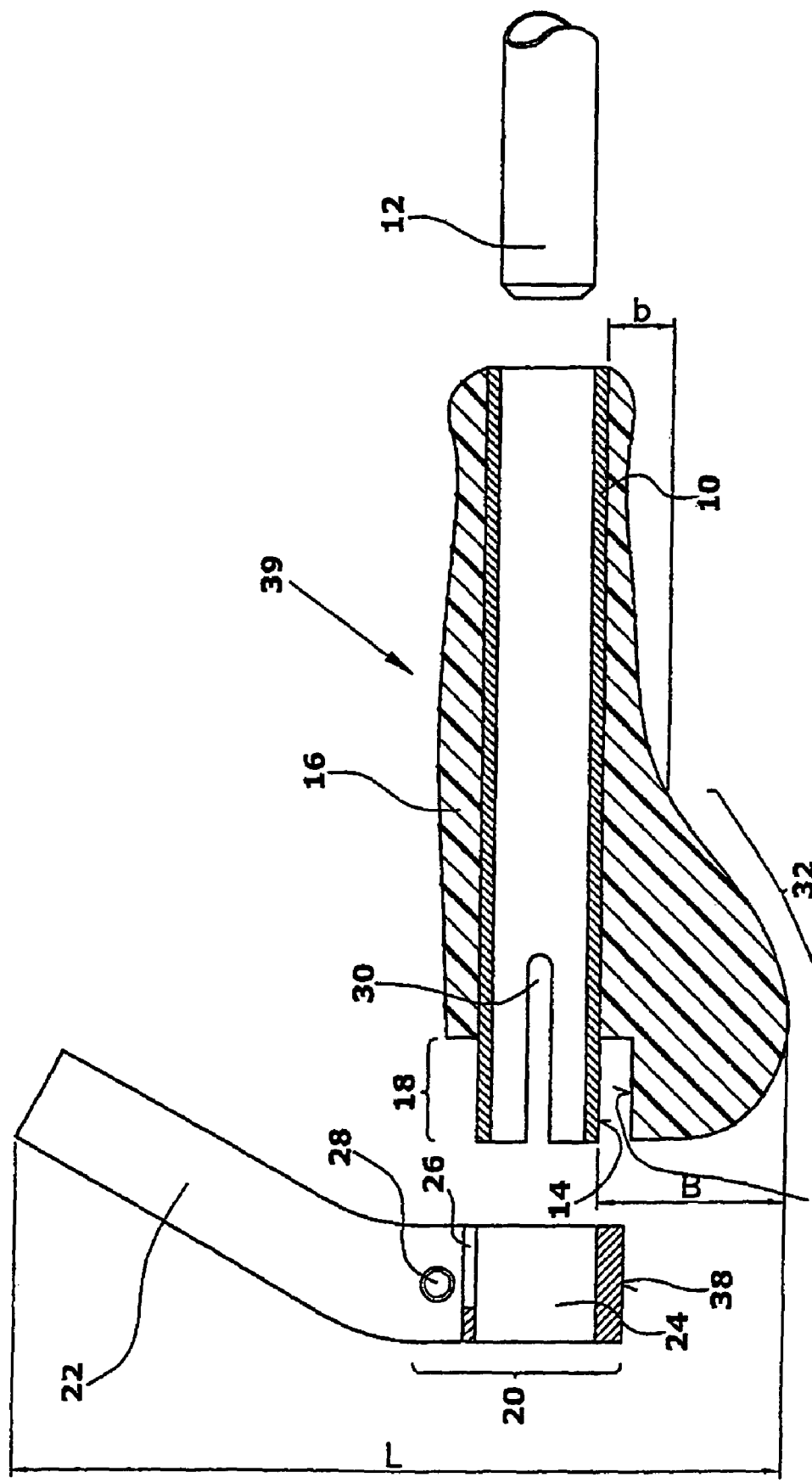
FIG. 1 is a schematic sectional view of the bicycle bar grip according to the invention in the dismounted state.

A preferred embodiment of a sleeve 45 (FIG. 7) comprises a wing-shaped projection 46. Preferably, the wing-shaped projection 46 has a uniform thickness that may amount to, e.g., 2 mm to 3 mm. If necessary, the wing-shaped projection 46 gets thicker in the region of the connection to the cylindrical sleeve portion 48 to achieve a better connection. Preferably, the entire sleeve 45 is made of a single plastic material and integrally formed. Further, the wing-shaped projection 46 preferably projects into the clamping area 18. In the clamping area 18, the sleeve 45 further comprises an eyelet 50 through which a screw 28 is inserted. By the eyelet 50, the position of the clamping means 20 with respect to the sleeve 45 is defined.

Preferably, material is injected around the sleeve 45 for manufacturing the grip element 16. This is preferably done in a mold, the sleeve 45 being manufactured by injection-molding in a first operational step, whereupon an elastomer or another substance is injected around it. To guarantee a secure connection between the grip element 16 and the sleeve 45, the wing-shaped projection preferably comprises through holes 52.

Likewise, the cylindrical portion 48 of the sleeve 45 may be provided with through holes 54 through which the elastomer penetrates and increases the friction with respect to the handlebar 12 when the bicycle bar grip is slipped on.

The bicycle bar grip according to the invention (FIG. 1) comprises a sleeve 10 for slipping onto a bike handlebar 12. On an outside 14 of the sleeve 10, a grip element 16 is arranged over a part of the length of the sleeve 10. A clamping area 18 is not covered by the grip element 16 so that a clamping means 20 forming part of a holding bar end extension 22 can be arranged therein.

The clamping means 20 comprises an opening 24 in which a horn slot 26 is arranged. By means of a screw 28 engaging into a blind bore thread, the circumference of the opening 24 can be reduced so that a clamping is effected. Since the sleeve 10 comprises a sleeve slot 30, the sleeve 10 is clamped with the bike handlebar 12 by the clamping means 20 at least in the clamping area 18. Since the sleeve 10 is rotatable before it is clamped on the bike handlebar 12, it is particularly easy to individually adapt the orientation and position of the grip element 16 to the needs of a cyclist.

The grip element 16 comprises a supporting portion 32 for particularly two-dimensionally supporting a palm. The supporting portion 32 smoothly changes into a holding portion 34 which projects into the clamping area 18 at a distance from the sleeve 10. The holding portion 34 has an inner contour 36 matching an outer contour 38 of the holding bar end extension 22. Thereby, a positive connection between the grip element 16 and the holding bar end extension 22 can be achieved so that the holding bar end extension 22 is fixed in its position relative to the grip element 16.

At the side of the grip element 16 facing away from the body, a thickening 39 is provided which is substantially arranged in the middle of the grip element 16. By means of the thickening 39, an offset of the wrist can be achieved so that the wrist substantially remains in a straight orientation when the bicycle bar grip according to the invention is gripped. Thereby, the danger of fatigue as well as the clamping of nerves is reduced.

A length l of the holding bar end extension 22 together with the holding portion 34 substantially corresponds to the width of a hand. Particularly, the length l amounts to 8-15 cm and preferably 8-12 cm. Outside, the supporting portion 32 has a width B amounting particularly to 2-7 cm and preferably to 3-4 cm. Inside, the supporting portion 32 has a width b which particularly amounts to 1-10 mm and preferably to 1.5-5 mm.

Figure 2:
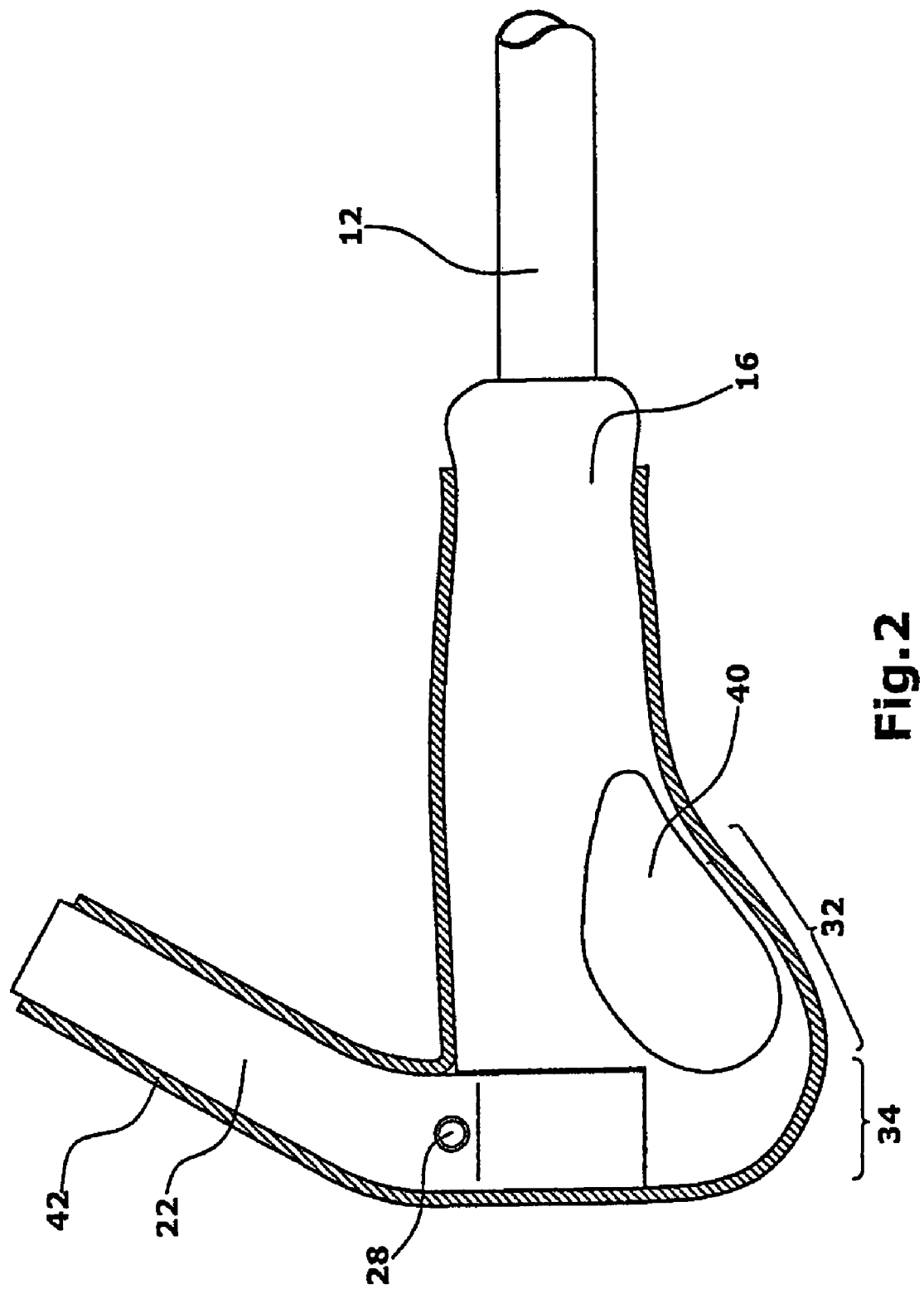
FIG. 2 is a schematic side view of the bicycle bar grip in the mounted state, partially in section.

Further, the supporting portion 32 comprises a pad 40 (FIG. 2) filled with a gel. The pad 40 is particularly arranged in the region of a contact surface on which a rotation of the palm is effected when the cyclist alters his grip between the grip element 16 and the holding bar end extension 22 or vice versa.

The holding bar end extension 22 and the grip element 16 are covered by a spacing fabric 42. Since the screw 28 is completely sunk in the holding bar end extension 22, a substantially uniform plane surface is ensured. The spacing fabric 42 is configured in several pieces, for example, and combined to a unit by molding. Further, the spacing fabric 42 may be connected with the grip element 16 by molding, vulcanizing or gluing.

The holding portion 34 may also project beyond the clamping area 18 (FIG. 3), i.e., the length $l_2$ from the beginning of the clamping area 18 to the end of the holding portion 34 is longer than the length $l_1$ of the clamping area 18. Thereby, it is possible to reduce the required space of the bicycle bar grip for the bike handlebar 12 by the distance of $l_2-l_1$. The clamping means 20 or the holding bar end extension 22 is preferably configured such that their width has the length $l_2$, the clamping effect, however, is particularly applied in the clamping area 18. This can be achieved particularly easily by the fact that the horn slot 26 of the clamping means 20 approximately has the length $l_1$.

Figure 3:
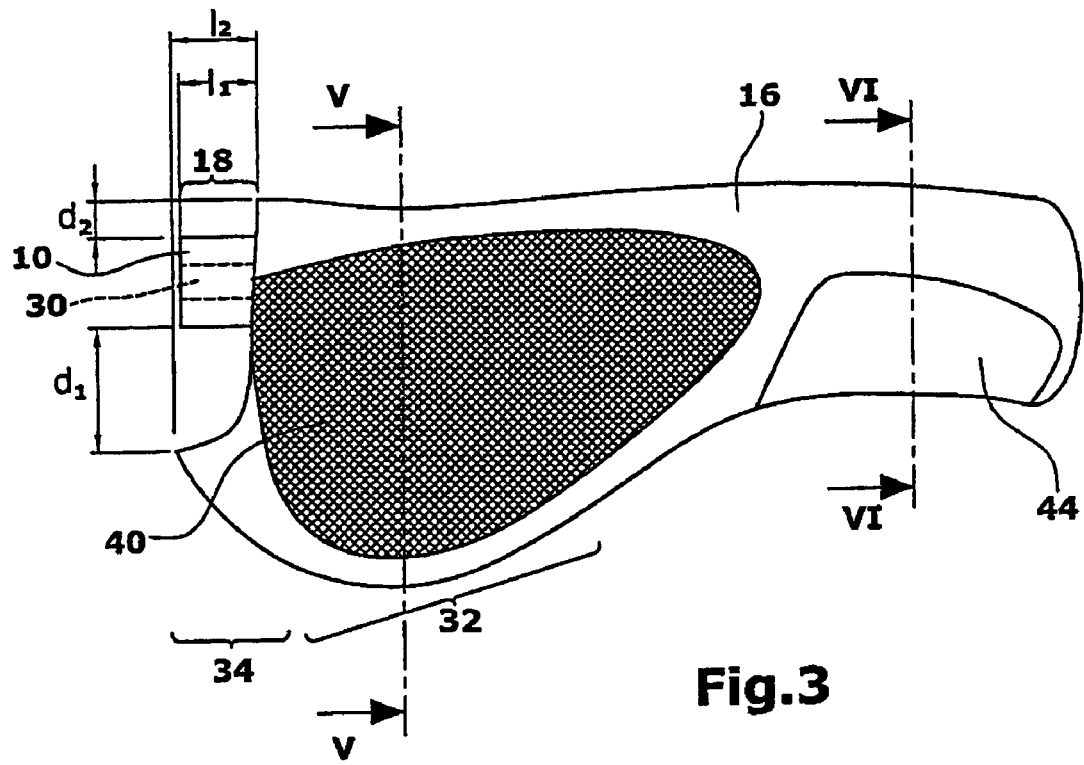
FIG. 3 is a schematic plan view of the bicycle bar grip without clamping means.

If, for example, the holding bar end extension 22 is used, the distance $d_1$ of the holding portion 34 to the sleeve 10 corresponds to the distance $d_2$ between the sleeve 10 and the end of the grip element 16. The distances $d_1$ and $d_2$ may differ from each other when a clamping means 20 configured as a clamping ring is used. Depending on whether the screw 28 in FIG. 3 is arranged above or below, the distance $d_1$ or $d_2$ is greater than the respective other one.

The grip element 16 may have a grip portion 44 being in contact with the thumb of the cyclist upon gripping. Particularly, the grip portion 44 has a low coefficient of friction so that the thumb can be moved particularly fast especially when the grip is altered. Further, sore skin surfaces, bladders and the like in the region between thumb and index finger are avoided thereby. Particularly, the grip portion 44 has a hydrophobic surface so that no adhesion forces occur with sweaty hands in particular.

Figure 4:
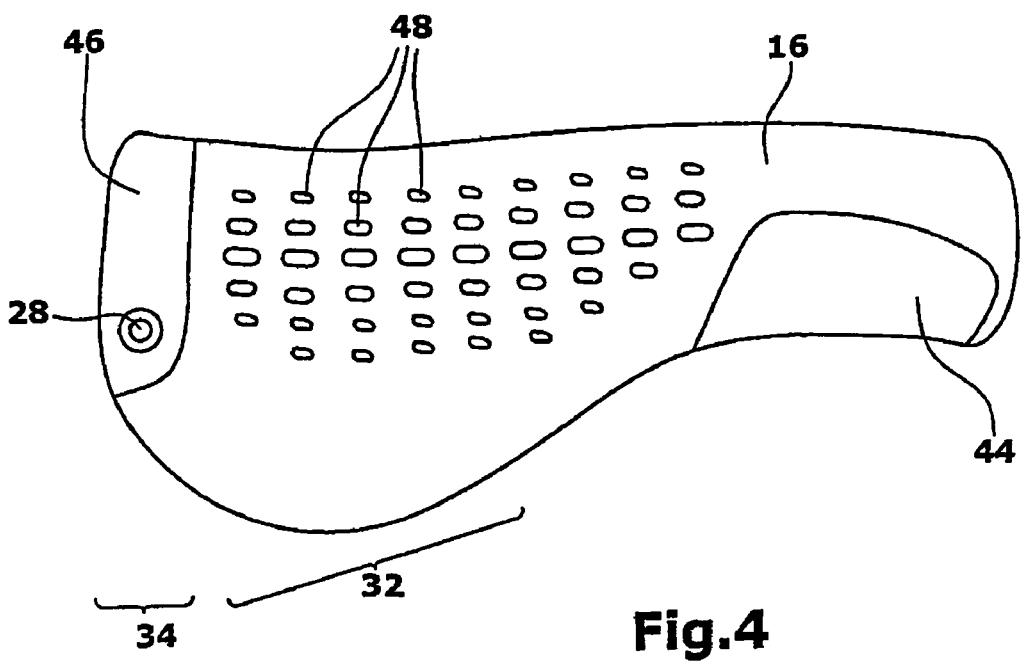
FIG. 4 is a schematic plan view of the bicycle bar grip with clamping means.

The grip element 16 may also have several depressions 48 (FIG. 4). By means of the depressions 48, a particularly high friction can be produced so that the hold of the cyclist is further improved. Such an area with a particularly high friction can be particularly provided at the underside of the supporting portion 32 so that the danger of the hand slipping off the grip element 16 is further reduced. In the illustrated embodiment, the clamping means 20 is configured as a clamping ring 46. The clamping ring 46 corresponds to the design of the grip element 16, i.e., the shape of the grip element 16 is not interrupted, but continued by the clamping ring 46. In the illustrated embodiment, the screw 28 is arranged in the lower portion of the clamping ring 46 so that the distance $d_1$ is greater than the distance $d_2$. Further, the screw 28 is completely sunk in the clamping ring 46 so that disturbing edges are avoided.

Figure 5:
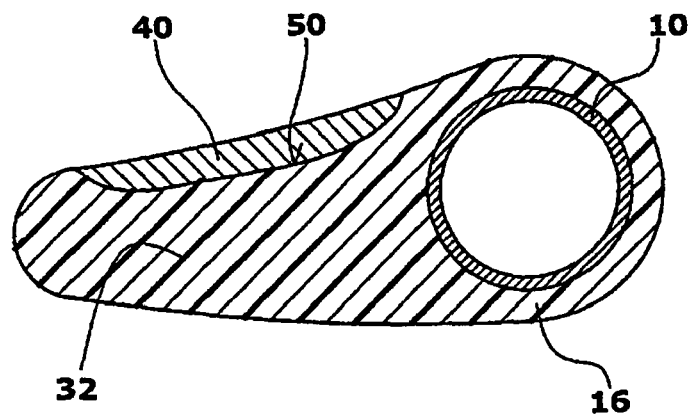
FIG. 5 is a schematic sectional view along the line V-V of FIG. 3.

In cross section, the supporting portion 32 has a substantially wedge-shaped configuration (FIG. 5), so that it is substantially directed radially away from the sleeve 10. For receiving the pad 40, the grip element 16 and the supporting portion 32, respectively, comprise a deepening 50 in which the pad 40 is fixedly connected by, e.g., molding, vulcanizing or gluing.

Figure 6:
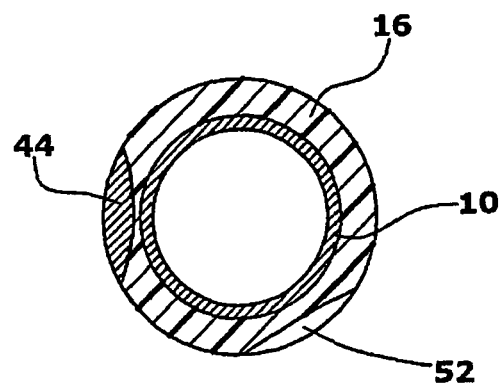
FIG. 6 is a schematic sectional view along the line VI-VI of FIG. 3.

Further, the grip element 16 may comprise recesses 52 (FIG. 6) for receiving the fingers. Thereby, the hold of the cyclist is further improved. Like the pad 40, the grip portion 44 can be connected with the grip element 16 by molding, vulcanizing or gluing.

In another preferred embodiment, a sleeve 45 is provided instead of the sleeve 10. Preferably, the sleeve 45 comprises a wing-shaped projection 46. Then, the grip element 16 can be injected around it. Thereby, the stability of the supporting portion 32 is increased. In the wing-shaped projection portion 46, through holes 52 are preferably provided.

Similarly, in a preferred embodiment, the sleeve 45 comprises through holes 54 even in the cylindrical portion. After the grip element 16 has been injected around, the through holes 54 support plastic projections.

Figure 7:
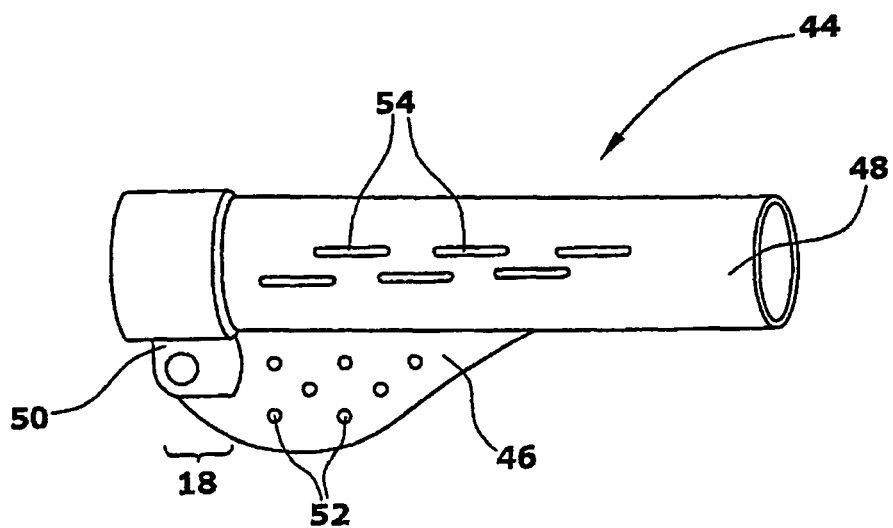
FIG. 7 is a schematic plan view of another embodiment of the sleeve.

Furthermore, the sleeve 45 illustrated in FIG. 7 comprises an eyelet 50 projecting into the clamping area 18 and serving to fix the clamping means 20.

In the region of the eyelet 50 which preferably forms part of the projection portion 46, the projection portion 46 is supported on the sleeve 45. Thereby, the stiffness of the wing-shaped projection portion 46 is increased.

To further increase the stiffness of the wing-shaped projection 46, the projection portion 46 has a preferably continuously decreasing thickness, starting from the sleeve 45. The projection portion 46 preferably has a thickness of 3-4 mm at the sleeve 45. At the opposite free end, the projection portion 46 preferably has a thickness of 1-2 mm. Further, it is particularly preferred that the transition between the projection portion 46 and the sleeve 45 is round. Preferably, a radius of 1.5-2 mm is provided on both sides.

What is claimed is:

1. A bicycle bar grip comprising:
   a handlebar sleeve comprising a sleeve slot and a clamping area arranged at an edge of the sleeve,
   a clamp connected to the sleeve in the clamping area,
   a grip element connected to the sleeve, and
   a holding bar end extension,
   wherein the grip element comprises a palm supporting portion and a holding portion so that the supporting portion and the holding portion form a common grip surface with the clamp,
   wherein the holding portion projects into the clamping area at a distance from the sleeve so that there is a gap between the holding portion and the sleeve in the clamping area, and a portion of the clamp is disposed within the gap between the holding portion and the sleeve, and
   wherein, when the bicycle bar grip is placed on a handlebar, the holding portion and the supporting portion project in a first direction, and the holding bar end extension projects in a second direction, wherein said first direction is opposite to said second direction.

2. The bicycle bar grip of claim 1, wherein the supporting portion is in contact with said palm of a user when said user grips the grip surface.

3. The bicycle bar grip of claim 1, wherein the supporting portion comprises a contact surface being in contact with said palm of a user when said user alters their grip from the grip element to the holding bar end extension or the clamp.

4. The bicycle bar grip of claim 3, wherein the contact surface is three-dimensionally configured, such that a turning of said palm of said user is effected on the contact surface while said grip is altered.

5. The bicycle bar grip of claim 1, wherein the holding portion is configured such that it is also held at least partially when at least one of the holding bar end extension and the clamp are held.

6. The bicycle bar grip of claim 1, wherein the supporting portion is wedge-shaped in cross section and, in longitudinal section, has a greater thickness outside than inside.

7. The bicycle bar grip of claim 6, wherein the length of the holding bar end extension along with the holding portion is from 8 cm to 15 cm.

8. The bicycle bar grip of claim 6, wherein said thickness of the supporting portion is thicker at the transition to the holding portion than it is elsewhere on the supporting portion.

9. The bicycle bar grip of claim 1, wherein the holding portion has an inner contour corresponding at least partially to an outer contour of the holding bar end extension or the clamp.

10. The bicycle bar grip of claim 9, wherein at least one of the holding bar end extension and said clamp, and said grip element have a positive connection therebetween.

11. The bicycle bar grip of claim 1, wherein the supporting portion has a contour being substantially configured so as to correspond to the contour of said palm of said user.

12. The bicycle bar grip of claim 1, wherein the grip element and at least one of said holding bar end extension and said clamp are at least partially covered by a shell covering particularly the clamp of the holding bar end extension.

13. The bicycle bar grip of claim 12, wherein the shell is configured at least partially as a spacing fabric.

14. The bicycle bar grip of claim 1, wherein the grip element comprises a pad including a deformable material, the pad having a higher deformability than the grip element.

15. The bicycle bar grip of claim 1, wherein the grip element comprises a connection projection projecting into the clamping area.

16. The bicycle bar grip of claim 1, wherein the grip element comprises recesses for receiving the fingers.

17. The bicycle bar grip of claim 1, wherein the clamp comprises a screw cooperating with a blind bore thread, the screw being completely sunk in the clamp.

18. The bicycle bar grip of claim 1, wherein the sleeve has a wing-shaped projection projecting into the supporting portion.

19. The bicycle bar grip of claim 18, wherein the wing-shaped projection projects into the holding portion.

20. The bicycle bar grip of claim 18, wherein the wing-shaped projection comprises through holes for improving the connection with the grip element.

21. The bicycle bar grip of claim 1, wherein the sleeve comprises through holes into which projections of the grip element project.

22. The bicycle bar grip of claim 1, wherein the sleeve comprises an eyelet projecting into the clamping area for fixing the position of the clamp.

23. The bicycle bar grip of claim 1, wherein the grip element has an offset relative to a handlebar, on a side of the grip element that is opposite to the holding portion and the supporting portion.

24. The bicycle bar grip of claim 23, wherein the offset is a thickening provided substantially in the middle of the grip element.

25. The bicycle bar grip of claim 1, wherein the sleeve slot does not extend along an entire length of the sleeve.

26. A bicycle bar grip comprising:
   a sleeve for being placed onto a bike handlebar, the sleeve comprising a clamping area at an end of the sleeve;
   a clamp connected to the sleeve in said clamping area, and
   a grip element connected to the sleeve, said grip element comprising a holding portion at an end of said grip element near said clamping area,
   wherein said holding portion projects into the clamping area at a distance from the sleeve so that there is a gap between said holding portion and said sleeve in said clamping area, and a portion of said clamp is in said gap between said holding portion and said sleeve, and
   wherein said clamp comprises a holding bar, said holding bar extending in a first direction away from said sleeve, and wherein said holding portion extends in a second direction away from said sleeve, wherein said first direction is opposite to said second direction.

27. The bicycle bar grip of claim 26, wherein the length of the holding bar along with the holding portion is from 8 cm to 15 cm.

28. The bicycle bar grip of claim 26, wherein the grip element and at least one of said holding bar end extension and said clamp are at least partially covered by a shell.

29. The bicycle bar grip of claim 28, wherein the clamp of the holding bar end extension is covered by the shell.

30. The bicycle bar grip of claim 26, wherein the grip element has an offset relative to a handlebar, on a side of the grip element that is opposite to the holding portion and the supporting portion.

31. The bicycle bar grip of claim 30, wherein the offset is a thickening provided substantially in the middle of the grip element.

32. The bicycle bar grip of claim 26, wherein the sleeve comprises a sleeve slot that does not extend along an entire length of the sleeve.

* * * * *